US009890906B2

(12) United States Patent
Wang et al.

(10) Patent No.: US 9,890,906 B2
(45) Date of Patent: Feb. 13, 2018

(54) FLOATING BALL FILLING-CONTROL DEVICE FOR CRYOGENIC TANK

(71) Applicant: Shijiazhuang Enric Gas Equipment Co., Ltd, Shijiazhuang (CN)

(72) Inventors: Wukai Wang, Shijiazhuang (CN); Lanhui Zhai, Shijiazhuang (CN); Lixia Wei, Shijiazhuang (CN); Jian Zhang, Shijiazhuang (CN); Chunjuan Wang, Shijiazhuang (CN); Xiao'e Pan, Shijiazhuang (CN); Minghui Dong, Shijiazhuang (CN); Huijie Zhang, Shijiazhuang (CN); Shengwen Shang, Shijiazhuang (CN)

( * ) Notice: Subject to any disclaimer, the term of this patent is extended or adjusted under 35 U.S.C. 154(b) by 115 days.

(21) Appl. No.: 14/899,692

(22) PCT Filed: Jul. 31, 2013

(86) PCT No.: PCT/CN2013/080534
§ 371 (c)(1),
(2) Date: Dec. 18, 2015

(87) PCT Pub. No.: WO2014/205887
PCT Pub. Date: Dec. 31, 2014

(65) Prior Publication Data

US 2016/0138761 A1 May 19, 2016

(30) Foreign Application Priority Data

Jun. 27, 2013 (CN) .......................... 2013 1 0260317

(51) Int. Cl.
*F16K 31/18* (2006.01)
*F17C 13/04* (2006.01)
*F17C 13/02* (2006.01)

(52) U.S. Cl.
CPC ............ *F17C 13/04* (2013.01); *F17C 13/021* (2013.01); *F17C 2201/00* (2013.01);
(Continued)

(58) Field of Classification Search
CPC ......... Y10T 137/7472; Y10T 137/7468; Y10T 137/7465; Y10T 137/7439;
(Continued)

(56) References Cited

U.S. PATENT DOCUMENTS 688,902 A * 12/1901 Turner ................ G01F 23/0007 137/214
916,927 A * 3/1909 Guedesse ................ F16K 31/26 137/442

(Continued)

FOREIGN PATENT DOCUMENTS

CN 2088635 U * 11/1991
CN 2513948 Y * 10/2002

(Continued)

OTHER PUBLICATIONS

Machine Translation of CN202868928U obtained from Espacenet on Jun. 16, 2017.*

(Continued)

*Primary Examiner* — Jessica Cahill

(57) ABSTRACT

Disclosed herein is a floating ball filling-control device for a cryogenic tank with enhanced structural stability. The floating ball filling-control device comprises a liquid feeding pipe (2) with a liquid discharging end disposed in the liquid storage tank (1), the liquid feeding pipe (2) having liquid spraying holes (3) located on the pipe wall at the top of the pipe, and a slide valve (4) arranged on the top end of the liquid feeding pipe, wherein the slide valve is in a sliding fit with the liquid feeding pipe in a vertical direction via a floating ball lever driving mechanism, and forms an open/close mechanism for the liquid spraying holes via a control mechanism.

7 Claims, 3 Drawing Sheets

(52) U.S. Cl.
CPC ................. *F17C 2203/0629* (2013.01); *F17C 2205/0335* (2013.01); *F17C 2205/0382* (2013.01); *F17C 2205/0391* (2013.01); *F17C 2223/0161* (2013.01); *F17C 2225/0161* (2013.01); *F17C 2225/042* (2013.01); *F17C 2250/0413* (2013.01); *F17C 2270/01* (2013.01)

(58) Field of Classification Search
CPC ......... Y10T 137/7423; Y10T 137/7459; F17C 13/04; F17C 13/021; F17C 2201/00; F17C 2203/0629; F17C 2205/0335; F17C 2205/0391; F17C 2223/0161; F17C 2225/0161; F17C 2225/042; F17C 2250/0413; F17C 2270/01
See application file for complete search history.

(56) References Cited

U.S. PATENT DOCUMENTS 1,243,766 A * 10/1917 Schmidt .................. F16K 31/26 137/425
1,279,468 A * 9/1918 Smith ..................... F16K 31/26 137/444
1,893,859 A * 1/1933 Gleason .................. F16K 31/26 137/441
2,738,801 A * 3/1956 Reaves ................. F16K 31/265 137/426
3,104,677 A * 9/1963 Fleckenstein ........... F16K 31/26 137/391
4,714,088 A * 12/1987 Ivins ......................... E03D 1/14 137/423
5,072,751 A 12/1991 Lin
5,464,037 A * 11/1995 Younes .................. F16K 31/26 137/410

FOREIGN PATENT DOCUMENTS

CN 202868928 U * 4/2013
JP 2006329385 A * 12/2006

OTHER PUBLICATIONS

Machine Translation of CN2088635U obtained from Espacenet on Jun. 16, 2017.*

* cited by examiner

FLOATING BALL FILLING-CONTROL DEVICE FOR CRYOGENIC TANK

CROSS REFERENCE TO RELATED APPLICATION

This application is a national stage application, filed under 35 U.S.C. §371, of PCT Application No. PCT/CN2013/080534, filed on Jul. 31, 2013, entitled "SEMICONDUCTOR DEVICE AND METHOD FOR MANUFACTURING THE SAME", which claimed priority to Chinese Application No. 201310260317.4, filed on Jun. 27, 2013, all of which are hereby incorporated by reference in their entirety.

FIELD OF THE INVENTION

The present invention relates to a filling-control device for a cryogenic tank in the field of cryogenic, atmospheric pressure liquefied gas storage and transportation. More particularly, the present invention relates to a floating ball filling-control device for a cryogenic tank.

BACKGROUND

Storage and transportation of liquefied natural gas is an extremely unique field, where most general metal containers cannot meet the requirements for tanks for storing liquefied natural gas. Austenitic stainless steels present good characteristics in terms of flexibility and sturdiness at low temperatures, and additionally, are fairly compatible with natural gas. As such, such steels are often chosen as the material of an internal tank. However, austenitic stainless steels also have a defect of low yield strength. For example, according to the GB 150 pressure vessel standard, one method is to use the yield strength and tensile strength of a material as reference points and divide them by their corresponding safety factors, and then take the smaller value to determine the allowable stress value of the material. Under this method, the austenitic stainless steel material would have a low value in terms of its tolerable stress, thereby unable to fully achieve the carrying capacity of the material. If a tank container is made from the austenitic stainless steel material without any treatment upon the material, then the enhanced safety requirement will require the consumption of more stainless steel materials, which will not only increase the manufacturing and transportation costs, but also reduce the liquid storage space. This approach is very uneconomical and thus is generally not employed by manufacturers. Therefore, certain strain strengthening is performed to improve the yield strength of austenitic stainless steel materials, which allows the tank body made after the strain strengthening process to have a reduced safety requirement, thereby not only lowering the cost of production materials, but also giving the tank body better flexibility, sturdiness and yield strength. However, if any opening or aperture is made in the tank body after the strain strengthening process, the overall structural strength of the tank body will be affected, nulling the effect of strain strengthening and thus rendering the tank body no longer usable. Accordingly, once the tank body is in use, it cannot be re-opened or made a hole therein for purposes of servicing or other operations. As a result, it is critical for the auxiliary devices arranged inside the storage tank to have great stability, especially those tanks used for transportation.

Specifically, for those tanks in a liquefied natural gas vehicle for transportation of natural gas, there is a much higher requirement for the structural stability inside the tank.

When an existing tank is used to fill a vehicular gas cylinder with liquid, it requires a certain safety space on the top of the liner of the gas cylinder, as a result of which an anti-overfilling device needs to be arranged inside the liner of the tank.

To that end, most existing technologies use a buffer tank inside the liner of the tank. However, the buffer tank has a bulky structure and low accuracy and therefore is not very effective in terms of controlling the filling of a non-empty tank. Some may use a floating ball valve for purposes of controlling the filling.

Floating ball valves are commonly used in our daily lives. The patent publication number CN101561057A discloses a floating ball valve, which is arranged outside the valve and connected with the internal valve via a lever so that the valve can open and close through the buoyancy of the floating ball in the liquid. Since the floating ball is arranged outside the floating ball valve, however, the floating ball valve is very unstable if used in the transportation process of the tank body, and the valve assembly is prone to wear and then becomes ineffective. In order to enable the floating ball valve to be used in liquefied gas transportation tanks, the stability of the floating ball filling-control valve needs to be guaranteed and the wear of the floating ball filling-control valve need to be alleviated. To this end, those skilled in the art decided to directly dispose the floating ball in the liquid feeding pipe so that it is constrained by the inner walls of the liquid feeding pipe and thus unable to move freely. This approach increases the stability of the floating ball, but causes new problems, one of which is, the diameter of the liquid feeding pipe cannot be too large because the liquid feeding pipe is fixed inside the tank body, and therefore the size of the floating ball is limited, which generally results in failure of the floating ball and the filling-control valve. In addition, the floating ball may not fit tight within the inner diameter of the wall of the liquid feeding pipe, and as such, the stability of the floating ball cannot be guaranteed even though the floating ball is arranged in the liquid feeding pipe. Once the filling-control valve fails to function, the tank body is filled up with cryogenic liquid beyond a limit, which can cause an excessively high pressure to the tank body to make the tank body highly susceptible to explosion.

Therefore, although the above approach, by directly disposing the floating ball filling-control device inside the liquid feeding pipe, can control the movement of the floating ball to some extent, the floating ball filling-control valve is still very unstable in the transportation process of the tank body because the size of the floating ball is limited and the ball is not completely stabilized. As a result, the safety in transportation of the tank is severely unpredicable under this approach. Furthermore, due to the instability of the floating ball filling-control valve, the frequency of damages to this valve is increased. Even if only a part of the filling-control valve is damaged, the tank will be no longer usable once the floating ball filling-control valve is damaged. This is because the tank cannot be re-opened or made a hole therein for replacement or servicing purposes. Therefore, a need exists for those skilled in the art to figure out how to extend the service life of the tank and provide stability of the filling-control device.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

Embodiments of the present invention are directed to a floating ball filling-limiting device for a low-temperature liquid storage tank, which solves the technical problem of tank failure due to the structural instability of existing floating ball filling-control devices. In one embodiment, the inventive floating ball filling-control device comprises a slide valve driven by a floating ball lever, which is arranged at a liquid outlet of a liquid feeding pipe. Such arrangement according to the present invention solves the technical problem of structural instability of existing floating ball filling-control device and extends the service life span of the tank.

In order to achieve the above object of the present invention, the following technical solution is used: a floating ball filling-control device for a cryogenic tank structurally comprises a liquid feeding pipe with a liquid discharging end disposed in the liquid storage tank, liquid spraying holes of the liquid feeding pipe being located on the pipe wall at the top of the pipe, wherein a slide valve is arranged on the top end of the liquid feeding pipe, and wherein the slide valve is in a sliding fit with the liquid feeding pipe in a vertical direction via a floating ball lever driving mechanism, and forms an open/close mechanism for the liquid spraying holes via a limiting mechanism.

According to one embodiment of the present invention, the slide valve is separated from the floating ball, and both are connected with each other via the lever and have opposite directions of motion. When the liquid flow needs to be closed, the floating ball moves upward and the slide valve moves downward, and the gravity of the slide valve and the buoyancy of the floating ball would be amplified by the lever co-act on the slide valve, thereby bringing a large closing force and also better reliability in action.

According to another embodiment of the present invention, the floating ball is sleeved on a pendulum shaft, which eliminates any wobbling movement of the floating ball; and at the same time, the central blind hole of the floating ball and the swing link form a plunger type cylinder, damping to fast movement is created by controlling the gap between the central blind hole and the pendulum shaft, which accordingly can alleviate the vibration of the floating ball due to bumpiness, avoid system oscillation and increase the vibration resistance of the system. Meanwhile, the device can always enable precise control over the highest liquid level regardless of the original height of the liquid level within the container.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

In the above FIGS. 1-3, 1 represents a liquid storage tank, 2 represents a liquid feeding pipe, 3 represents a liquid spraying hole, 4 represents a slide valve, 4-1 represents a horizontal pin shaft, 5 represents a supporting plate, 6 represents a swing link, 7 represents a floating ball, 8 represents a horizontal lever, 9 represents a connecting rod, 10 represents a sliding sleeve, and 10-1 represents blind hole.

DETAILED DESCRIPTION OF EXEMPLARY EMBODIMENTS

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

Figure 1:
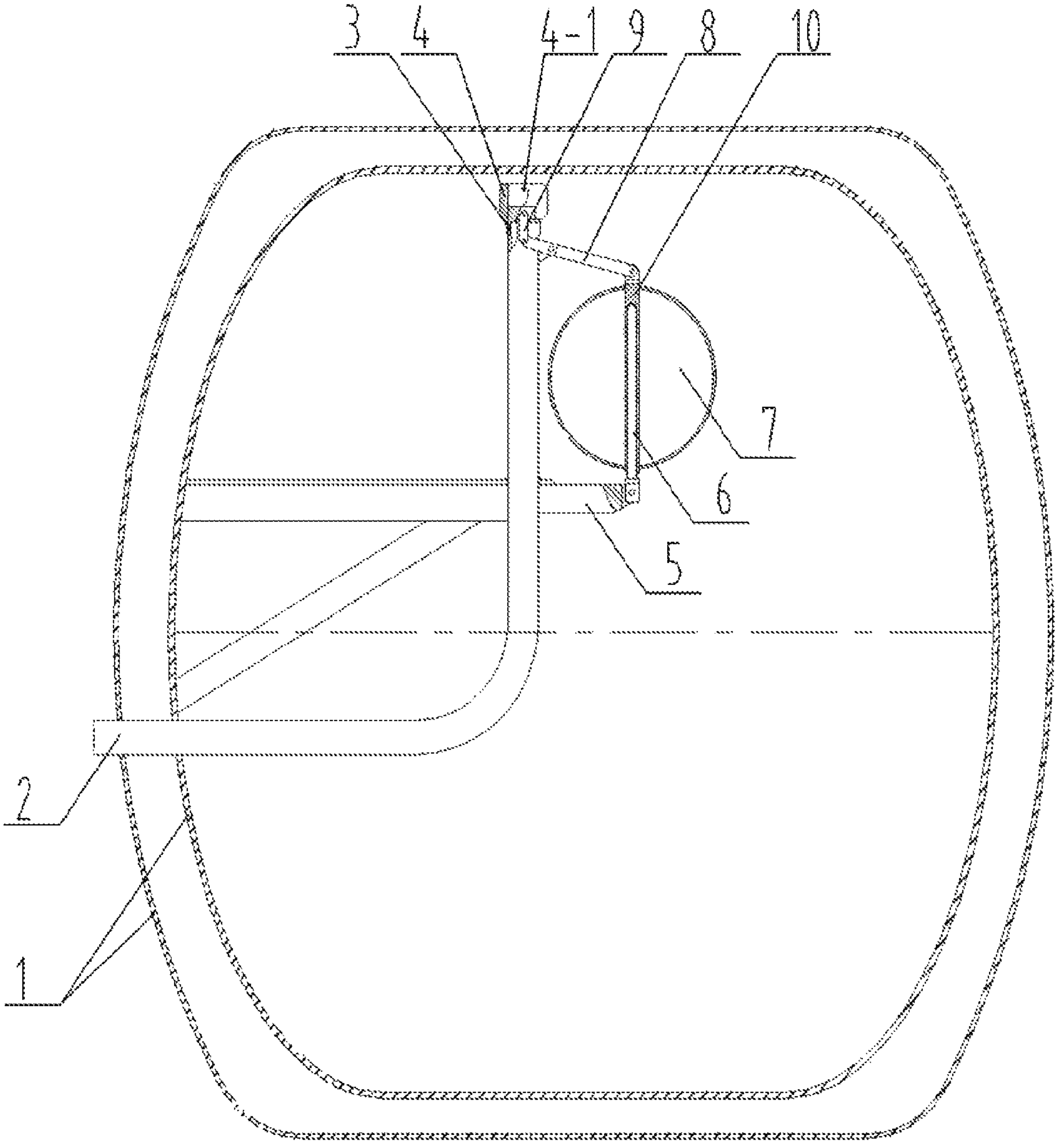
FIG. 1 is a schematic diagram illustrating a state in which the slide valve is opened according to embodiments of the present invention.

As shown in FIG. 1, a floating ball filling-control device for a cryogenic tank comprises a liquid feeding pipe 2 with a liquid discharging end disposed in the liquid storage tank 1. A few liquid spraying holes 3 of the liquid feeding pipe 2 are located on the pipe wall at the top of the pipe. A slide valve 4 is such arranged on the top end of the liquid feeding pipe 2 that the slide valve 4 is in a sliding fit with the liquid feeding pipe 2 in a vertical direction via a floating ball lever driving mechanism, and forms an open/close mechanism for the liquid spraying holes 3 via a control mechanism.

In one embodiment, the aforementioned floating ball lever driving mechanism comprises a swing link 6 with one end coupled to a supporting plate 5 at the inner wall of the liquid storage tank 1, a floating ball 7, and a horizontal lever 8. Further, one end of the horizontal lever 8 is connected to the slide valve 4 via a connecting rod 9, the other end of the horizontal lever 8 is hinged with the floating ball 7 via a connecting assembly disposed on a central shaft of the floating ball. Also, the other end of the swing link 6 is positioned within the floating ball 7 along the center shaft of the floating ball 7 and is in a sliding fit with the floating ball 7 in the vertical direction.

Figure 2:
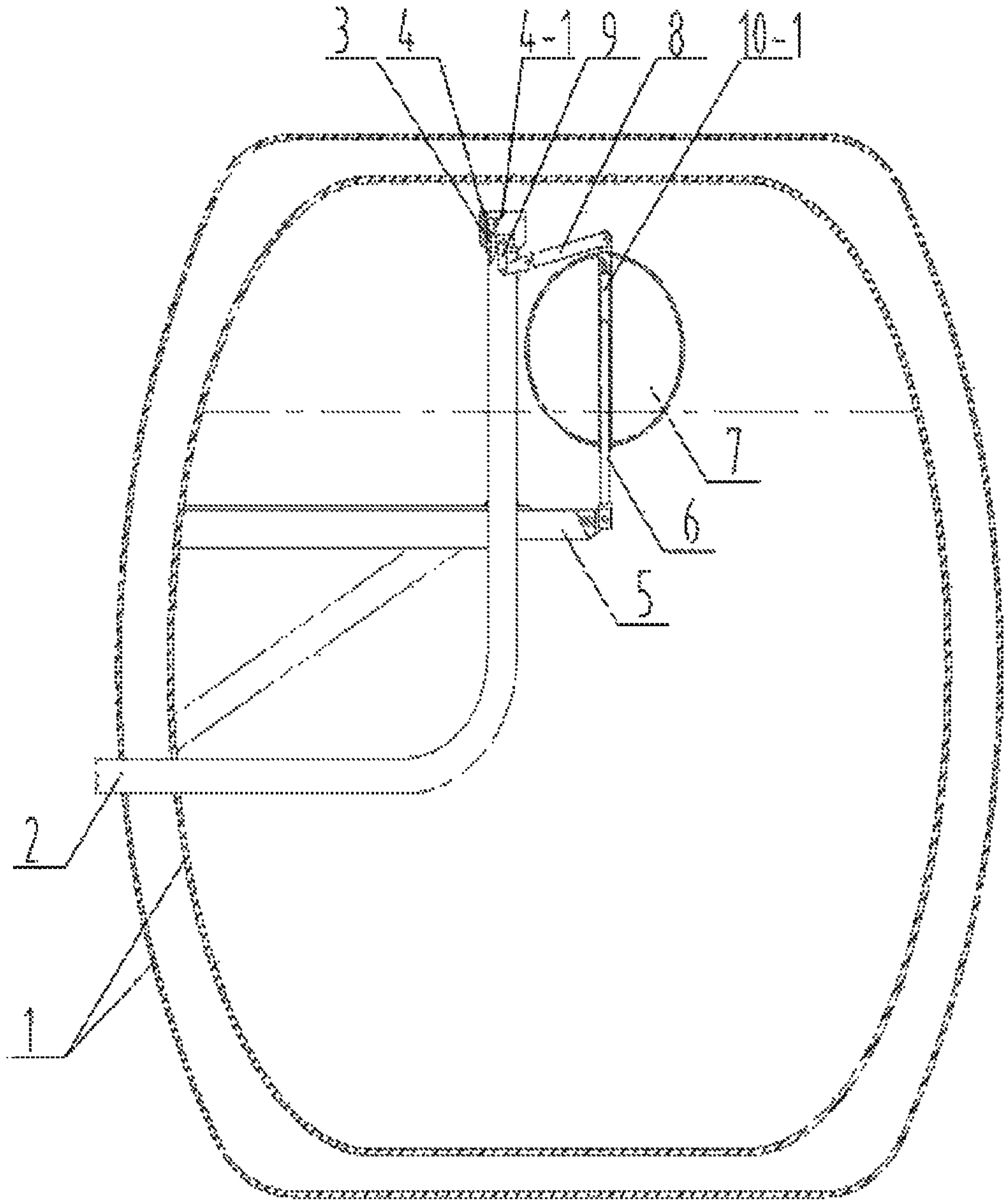
FIG. 2 is a schematic diagram illustrating the state of the pipe wall of the slide valve according to embodiments of the present invention.
Figure 3:
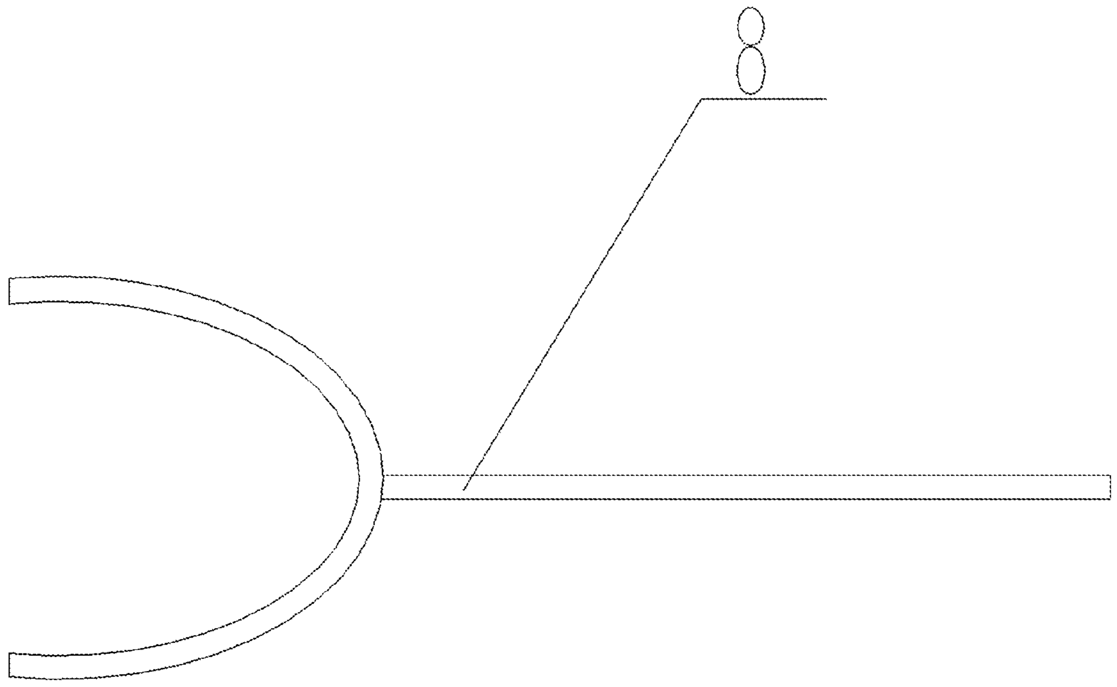
FIG. 3 is a top view of the horizontal lever of the slide valve in FIG. 1.

As shown in FIG. 2, the connecting assembly disposed on the central shaft of the floating ball is a sliding sleeve 10, which includes a blind hole 10-1 on the upper part thereof, and the upper end of the sliding sleeve 10 is hinged with the horizontal lever 8. The swing link 6 is slidably positioned within the sliding sleeve 10 by the lower end of the sliding sleeve 10; and the floating ball is stablized through the blind hole 10-1 within the sliding sleeve 10.

The swing link 6 and the blind hole 10-1 form a plunger type cylinder damping mechanism via clearance fit.

The pivot point of the horizontal lever 8 is limited on a supporting base on the pipe wall of the liquid feeding pipe 2 via a pin shaft.

The control mechanism of the slide valve 4 is a horizontal pin shaft 4-1 transversely positioned at the top end of the slide valve 4.

The arm length ratio of a limiting end to a driving end of the horizontal lever 8 is: 1-3:1.

Usually 2-4 groups of the liquid spraying holes 3 are disposed on the liquid feeding pipe 2 and are uniformly distributed on the pipe wall, and the top end of the liquid feeding pipe 2 is closed.

The driving end of the horizontal lever 8 is of a U-shaped shifting fork type structure.

An exemplary process for assembling the above device works as follows: referring to FIG. 1, the top of the liquid feeding pipe 2 is blocked off, and a plurality of liquid spraying holes 3 are provided on the circular section near the top. Pin shafts are mounted on the two sides of the lower portion of the slide valve 4 and the horizontal pin shaft 4-1 is transversely arranged on the upper part of the slide valve; the slide valve 4 is sleeved on the upper part of the liquid feeding pipe 2. The slide valve 4 is connected with the floating ball 7 via the connecting rod 9 and the horizontal lever 8. A through shaft is arranged in the center of the floating ball 7, a pin hole is formed on the top end of the shaft, and the shaft is fixed to the long arm end of the horizontal lever 8 through the pin shaft; the blind hole 10-1 opening downwardly is formed on the central shaft of the floating ball to form the sliding sleeve 10, so that the floating ball 7 is sleeved on the swing link 6. The limiting end of the swing link 6 is fixed on the supporting plate 5 through the pin shaft to allow the swing link 6 to swing in the left and right directions only.

In operation, the above-described device works as follows: referring to FIG. 2, when the liquid level drops, the floating ball drops accordingly and drives the slide valve to move upward via the lever, and the liquid spraying holes are opened, enabling feeding of liquid into the container through the liquid feeding pipe; as the liquid level continues to drop, the swing link will push against the bottom of the blind hole of the floating ball, limiting further movement of the floating ball and the slide valve. Referring back to FIG. 1, when the liquid level rises, the floating ball rises accordingly and drives the slide valve to move downward via the lever until the liquid spraying holes are closed; at this time, the liquid feeding device detects a signal indicating resistance increase and stops liquid feeding immediately; when the slide valve drops to the lowest position, the transverse pin shaft on the upper part of the slide valve will come into contact with the top of the liquid feeding pipe, limiting further downward movement of the slide valve.

According to one embodiment of the invention, the slide valve is separated from the floating ball, and both are connected with each other via the lever and have opposite directions of motion. When the liquid flow needs to be closed, the floating ball moves upward and the slide valve moves downward, and the gravity of the slide valve and the buoyancy of the floating ball would be amplified by the lever co-act on the slide valve, thereby bringing a large closing force and also better reliability in action. In another embodiment, the floating ball is sleeved on a pendulum shaft, which eliminates wobbling of the floating ball; and at the same time, the central blind hole of the floating ball and the swing link form a plunger type cylinder, damping to fast movement is created by controlling the gap between the central blind hole and the pendulum shaft, which accordingly can alleviate the vibration of the floating ball due to bumpiness, avoid system oscillation and increase the vibration resistance of the system. Meanwhile, the device can enable precise control over the highest liquid level regardless of the original height of the liquid level within the container.

What is claimed is:

1. A floating ball filling-control device for a cryogenic tank, comprising:

a liquid feeding pipe (2) with a liquid discharging end disposed in a liquid storage tank (1), the liquid feeding pipe (2) having liquid spraying holes (3) located on a pipe wall at a top end of the liquid feeding pipe (2), wherein a slide valve (4) is arranged on the top end of the liquid feeding pipe (2), the slide valve (4) positioned in a sliding fit with the liquid feeding pipe (2) in a vertical direction via a floating ball lever driving mechanism so as to form an open/close mechanism for the liquid spraying holes (3) via a limiting mechanism of the slide valve (4), wherein the floating ball lever driving mechanism comprises, a swing link (6) with one end provided on a supporting plate (5) at an inner wall of the liquid storage tank (1), a floating ball (7), and a horizontal lever (8), wherein one end of the horizontal lever (8) is connected to the slide valve (4) via a connecting rod (9), and another end of the horizontal lever (8) is hinged with the floating ball (7) via a connecting assembly disposed on a central shaft of the floating ball, wherein, another end of the swing link (6) is provided within the floating ball (7) along the central shaft of the floating ball (7) and is in a sliding fit with the floating ball (7) in the vertical direction.

2. The floating ball filling-control device for a cryogenic tank according to claim 1, wherein the connecting assembly disposed on the central shaft of the floating ball comprises a sliding sleeve (10) with a blind hole (10-1) on the upper part thereof, and an upper end of the sliding sleeve (10) is hinged with the horizontal lever (8), and wherein the swing link (6) is slidably positioned within the sliding sleeve (10) by a lower end of the sliding sleeve (10), and the floating ball (7) is limited by the blind hole (10-1) within the sliding sleeve (10).

3. The floating ball filling-control device for a cryogenic tank according to claim 2, wherein the swing link (6) and the blind hole (10-1) form a plunger type cylinder damping mechanism via a clearance fit.

4. The floating ball filling-control device for a cryogenic tank according to claim 1, wherein the limiting mechanism of the slide valve (4) is a horizontal pin shaft (4-1) transversely positioned at a top end of the slide valve (4).

5. The floating ball filling-control device for a cryogenic tank according to claim 1, wherein the horizontal lever (8) has a limiting end and a driving end, and the length ratio between the limiting end and the driving end falls within the range of 1:1 and 3:1.

6. The floating ball filling-control device for a cryogenic tank according to claim 1, wherein 2-4 groups of the liquid spraying holes (3) are disposed on the liquid feeding pipe (2) and are uniformly distributed on the pipe wall, and the top end of the liquid feeding pipe (2) is closed.

7. The floating ball filling-control device for a cryogenic tank according to claim 1, wherein a driving end of the horizontal lever (8) is of a U-shaped shifting fork type structure.

* * * * *